United States Patent [19]

Brouns et al.

[11] Patent Number: 5,084,102
[45] Date of Patent: Jan. 28, 1992

[54] CEMENT, METHOD OF PREPARING SUCH CEMENT AND METHOD OF MAKING PRODUCTS USING SUCH CEMENT

[75] Inventors: Seratius J. P. Brouns; Willem van Loo, both of Maastricht, Netherlands

[73] Assignee: Eerste Nederlandse Cement Industrie (ENCI) N. V., Maastricht, Netherlands

[21] Appl. No.: 455,620

[22] Filed: Dec. 22, 1989

[30] Foreign Application Priority Data

Dec. 23, 1988 [NL] Netherlands ............ 8803158

[51] Int. Cl.$^5$ ............ C04B 35/00; C04B 7/02; C04B 7/14; C04B 7/32
[52] U.S. Cl. ............ 106/707; 501/155; 106/600; 106/602; 106/624; 106/705; 106/709; 106/714; 106/819; 106/DIG. 1
[58] Field of Search ............ 501/155; 106/789, 600, 106/602, 606, 624, 638, 705, 707, 709, 713, 714, 819, DIG. 1

[56] References Cited

U.S. PATENT DOCUMENTS

| | | | |
|---|---|---|---|
| 4,306,912 | 12/1981 | Forss | 106/117 |
| 4,318,744 | 3/1982 | Dodson | 106/90 |
| 4,410,365 | 10/1983 | Glukhovsky et al. | 106/84 |
| 4,640,715 | 2/1987 | Heitzmann et al. | 106/85 |
| 4,642,137 | 2/1987 | Heitzmann et al. | 106/85 |
| 4,842,649 | 6/1989 | Heitzmann et al. | 106/89 |

FOREIGN PATENT DOCUMENTS

| | | |
|---|---|---|
| 0157749 | 10/1985 | European Pat. Off. |
| 31145 | 2/1952 | Luxembourg |
| 7608760 | 2/1977 | Netherlands |
| 8204255 | 6/1984 | Netherlands |
| 8601766 | 3/1986 | PCT Int'l Appl. |

OTHER PUBLICATIONS

Chemical Abstracts, 97, 303(1982) 97: 10936b "Slag Cement Without Clinker".
Chemical Abstracts 96, 298 (1982) 96: 39768P "On the Process Development of SF Cements".

Primary Examiner—William R. Dixon, Jr.
Assistant Examiner—Michael A. Marcheschi
Attorney, Agent, or Firm—Michael N. Meller

[57] ABSTRACT

A cement based on blast-furnace slag and fly ash, characterized in that the cement is a homogeneous dry particulate mixture in ready-to-use form, which comprises blast-furnace slag having a specific surface area of 500–650 m$^2$/kg and fly ash in a weight ratio in the range of 20/80–60/40, and further comprises the following components in the amounts indicated, calculated on the total mixture: at least 2% by weight of portland cement clinker and 2–12% by weight of sodium silicate (calculated as Na$_2$O+SiO$_2$).

9 Claims, No Drawings

CEMENT, METHOD OF PREPARING SUCH CEMENT AND METHOD OF MAKING PRODUCTS USING SUCH CEMENT

The invention relates to a cement based on blast-furnace slag and fly ash.

From "Journal Soc. Chem. Ind." 9, 191-202 (1940) it is known to activate blast-furnace slag with an alkaline substance to improve its hydraulic properties.

Further, "World Cement Technology" 11/12, 223-233 (1977) reports on an extensive study into the use of cement based on finely ground blast-furnace slag and fly ash in which a solution of sodium hydroxide is used as an activator.

From "Silicates Industriels" 3, 79-82 (1983) a so-called F-cement is known, which yields a concrete of low porosity. The F-cement comprises low-lime silicates, such as blast-furnace slag and fly ash, and an F additive for activating the silicates. The liquid F additive contains an alkaline substance and, in addition, a lignosulfate as a dispersing agent. Further additives, such as anti-foaming agent, may also be present.

From LU-A-31,145 it is known to prepare a cement comprising a mixture of fly ash and ground blast-furnace slag. Various additives may be added, such as ammonium sulfate, calcium sulfate, and calcium chloride. Another additive is portland cement in a proportion of 5-10% or an alkaline salt, for instance sodium sulfate or sodium silicate. The mixture described in the Example comprises blast-furnace slag and fly ash in a weight ratio of 65/35, and contains, in addition to other additives, 7% of portland cement. This known cement is claimed to have good strength development characteristics.

In an article by R. C. Maheshwari and D. S. Walia entitled "On the Process Development of SF Cements" in Indian Chemical Manufacturer, 1979, pages 35-39, cement mixtures are reported which comprise ground slag and fly ash in a ratio of about 1:1, to which an activator is added. These known cement mixtures do not contain portland cement clinker. The activators that were tested are sodium hydroxide, sodium silicate, sodium carbonate, and hydrated lime. Only with sodium hydroxide could a moderate strength development be achieved.

We have now found a new ready-to-use dry or solid cement which can easily be handled, has a high storage stability, and, when processed, yields a concrete that has good strength properties and offers eminent resistance to the corrosive effects of an acid environment.

Accordingly, a cement of the type described in the opening line hereinabove is characterized, according to the present invention, in that the cement is a homogeneous dry particulate mixture in ready-to-use form, which comprises blast-furnace slag having a specific surface area of 500-650 m$^2$/kg and fly ash in a weight ratio in the range of 20/80-60/40, and further comprises the following components in the amounts indicated, calculated on the total mixture:

| | |
|---|---|
| portland cement clinker | at least 2 wt. % |
| sodium silicate (calculated as Na$_2$O + SiO$_2$) | 2-12 wt. % |

All specific surface area values given herein and in the appendant claims have been determined by the Blaine method.

For the composition of the present cement abundantly available industrial by-products and waste material are used, in particular granulated blast-furnace slag and powdered coal fly ash. Generally, there is little limestone involved, which considerably slows down the exhaustion of this natural substance. Moreover, a substantial amount of energy is saved in this way, since the processing of limestone into portland cement clinker, from which portland cement is prepared, takes a lot of energy. The present cement can be stored for a long time and can readily be mixed with water and the conventional aggregates to form a concrete that has a good initial strength and exhibits a favourable strength development. The present cement is specifically intended for the production of concrete constructions, products or parts which are exposed to strongly acid environmental conditions for long periods of time. Examples of such constructions, etc., are sewage treatment plants, sewage pipes, silos for storing feed, cattle shed and pigsty floors and elements for such stable floors, constructions for manure storage, etc. Such strongly acid environmental conditions where the pH is 1-2 are more and more of a problem today, and concrete made from the types of solid cement that are commercially available at present cannot long enough withstand such aggressive environmental conditions. Indeed, after only a few years such concrete may well be corroded beyond repair.

The starting materials for the composition of the present cement are known per se. Blast-furnace slag is a residual product of the production of pig iron and mainly consists of compounds of lime with silicic acid, aluminum oxide and magnesium oxide. If necessary, the blast-furnace slag is first dried and then, still in dry form, it is ground to the desired fineness, which for the present purpose corresponds to a specific surface area of 500-650 m$^2$/kg. The rule says that a greater initial strength is achieved according as the specific surface area is larger. This is relevant with a view to the removal of the formed concrete products from the molds. A greater initial strength permits earlier removal of the formed products, whereafter the molds can be used again for making new products. A specific surface area below 500 m$^2$/kg does not result in an acceptable final strength, whereas a specific surface area above 650 m$^2$/kg can hardly or not be realized by dry grinding on an industrial scale. Blast-furnace slag has so-called latent hydraulic properties, which means that an activator is required to activate those properties. Solid sodium silicate, to be incorporated in the cement, functions as an activator, in combination with the portland cement clinker.

The use of fly ash is also known in the cement industry. Fly ash is a residual product of coal burning in power plants. If these are fuelled with powdered coal, powdered coal fly ash is produced, but if fuelled with brown coal, brown coal fly ash is produced. Fly ash mainly consists of silicon oxide, iron oxide, and calcium oxide. Like blast-furnace slag, fly ash has latent hydraulic properties, which means an activator is indispensable, as discussed above. Usually fly ash as such already has a specific surface area of about 300 m$^2$/kg, which is sufficient for the present purpose, so that a grinding treatment can be dispensed with.

Portland cement clinker is prepared according to known procedures. The portland cement clinker is ground fine to a specific surface area which for the present purpose is preferably at least 300 m$^2$/kg and more preferably 500 m$^2$/kg or more. The portland cement clinker promotes the initiation of the hydration process and the initial strength development. This is important with a view to rapid demolding. The presence of portland cement clinker is more necessary according as the weight ratio of blast-furnace slag to fly ash is smaller, for instance 55/45 or less, and according as the blast-furnace slag is less fine. The portland cement clinker is preferably used in an amount of 2-15% by weight and more preferably in an amount of 2-6% by weight. Using more portland cement clinker than is necessary results in a decrease of the resistance of the concrete to a strongly acidic environment.

Solid dry sodium silicate in particulate form is an essential component of the present cement mixture because the sodium silicate activates both the blast-furnace slag and the fly ash when the concrete mortar is prepared with inter alia water. The sodium silicate initiates the hydration of the slag and the fly ash, thus enabling the reaction forming water-insoluble products to take place. Sodium silicate not only has the activating or initiating function just described, but takes part in the hardening process itself, i.e. in the reactions involved therein. It is important for the sodium silicate to be readily soluble in water to permit efficient activation of the blast-furnace slag and the fly ash to take place within acceptable time limits for preparing the mortar. Preferably a sodium silicate is used having an $SiO_2$/$Na_2O$ ratio that is within the range of 0.8-1.2. Good results are obtained with sodium silicate that also contains water of crystallization. Any water of crystallization that is present has been discounted in the specification of the amount of sodium silicate to be used in the present cement (2-12% by weight). Preferably hydrated sodium silicate is used in the form of particles or granules that have a size of 0.2-2.0 mm, are stable in the air, and do not give off dust when the cement is prepared and handled. Thus the risk of irritation due to handling by human beings is reduced to a minimum.

All kinds of additives for regulating the workability and the water demand can be incorporated according to need. Calcium sulfate can be mentioned as an example of an additive for regulating the setting time of the concrete mortar prepared. Calcium sulfate of various origins can be used. Preferably calcium sulfate is used which comes from industrial processes, for instance the desulphurization of flue gas from power plants, the preparation of phosphoric acid, or the preparation of hydrogen fluoride. The point is that such calcium sulfate is available in great quantities and for the present purpose it can be ground together with the blast-furnace slag or the portland cement clinker. The calcium sulfate need not really be ground because it has a suitable fineness of itself. During the grinding process the lumps of calcium sulfate are actually just pulverized, and the fine particles are mixed with the blast-furnace slag or the portland cement clinker. If wet calcium sulfate is used, this sulfate will also be dried during the grinding process.

The present cement can be prepared by grinding those components that need to be ground because they do not have the desired fineness, and then to compose the cement by putting together the ground components and the other components, which are already sufficiently fine, by carrying out a mixing treatment in order to obtain the ready-to-use homogeneous particulate cement. The mixing treatment can be carried out in known industrial mixers for fine, dry substances, such as mixed feed, artificial fertilizers, dry cement mortars and the like. By mixing at a temperature of 50° C. or less it is ensured that the water of crystallization of the hydrated sodium silicate is retained. The various components are mixed in the proportions indicated above, but preferably the ratio of blast-furnace slag to fly ash is within the range of 30/70-55/45 (the larger the relative amount of fly ash, the larger the acid-resistance of the products made with the cement) and the other components are used in the following proportions:

| | |
|---|---|
| cement clinker | 26 wt. % |
| sodium silicate (calculated as $Na_2O$ + $SiO_2$) | 47 wt. % |

Then the mixture is ready for use.

The present cement is usually factory-processed, and thus thoroughly mixed with water and all kinds of aggregates varying from sand having a minimum size of about 0.1 mm to gravel having a maximum size of about 32 mm, of course depending on the products one wishes to make. The finished mortar can then for instance be introduced into iron molds, which have optionally been treated with a suitable mold-release oil. Characteristic of the present cement is the fact that little water is required—as will be explained in more detail below—so that a concrete can be produced which has a low porosity. Due to the portland cement clinker and the fineness of the blast-furnace slag, a sufficiently high initial or threshold strength is achieved rapidly, so that demolding can be carried out relatively soon after and the molds can be used again. Typically after 1 to 2 days the initial strength is sufficiently high to permit demolding and further handling. It is recommendable to subsequently keep the formed product humid for some time to ensure a good strength development during hardening. The product thus obtained has a good final strength (after 28 days).

As noted above, to make the mortar with the present cement only a relatively small amount of water is required. The proportion of water required in the application of the known dry types of cement, expressed as the ratio of water to cement, is about 0.5, whereas in the application of the present cement a considerably smaller water/cement ratio of only 0.25-0.4 is sufficient. Owing to this and to cement-chemical factors, a hardened product of low porosity is obtained. This physical characteristic is probably one of the factors that account for the high durability of the hardened products in a very strongly acid environment. It goes without saying that this hypothesis regarding the eminent acid-resistance obtained is given without prejudice to the present invention and the rights claimed herein.

In view of its particular characteristics as described above, the present cement is to be looked upon primarily as a ready-to-use dry cement that is particularly intended for the production of concrete constructions and products which by the nature of their application must be resistant against the corrosive effects of strongly acid environmental conditions as long and as effectively as possible. A number of examples of such applications—illustrating but not limiting the invention—have been mentioned above.

The invention will now be illustrated in and by the following Example.

EXAMPLE AND COMPARATIVE EXAMPLES

Blast-furnace slag and portland cement clinker were ground until the specific surface area values specified for the slag and the portland cement clinker respectively were reached. Then the particulate components specified in the table below were homogeneously mixed in the specified amounts at a temperature below 50° C. to form ready-to-use cements.

Each of the cements thus prepared was then mixed with standard sand (in accordance with DIN 1164) and water to form a mortar comprising 450 parts by weight of cement to 1350 parts by weight of sand, the water/cement ratio of each mortar being specified in the Table. The flow values of the mortars obtained are also specified in the Table. From the various mortars blocks were made measuring 40×40×160 mm, which were removed from the molds after 1 day and were then conditioned up to the 28th day inclusive at 20° C. and a relative humidity above 95%.

The compressive strength of the test pieces was determined after 1 day and after 28 days. After 28 days of hardening the finished test pieces were immersed in a sulphuric acid solution to investigate their durability in a strongly acidic environment in terms of the loss of weight sustained. The compressive strength values and the weight loss values that were found are specified in the Table.

For the purpose of further comparison the same tests were carried out using a commercially available blast-furnace cement (Hofanorm manufactured by ENCI, Maastricht, The Netherlands).

TABLE

| | Comparative examples | | | |
|---|---|---|---|---|
| | 1 (Enci Hofanorm) | 2 | 3 | Example |
| ground blast-furnace slag | | | | |
| weight % | ca. 65 | 45.0 | 43.9 | 44.3 |
| specific surface area (m²/kg) | * | 600 | 450 | 600 |
| fly ash (75% <32 μm) weight % | — | 45.0 | 43.8 | 44.2 |
| ground portland cement clinker | | | | |
| weight % | ca. 35 | 1.0 | 3.5 | 2.7 |
| specific surface area (m²/kg) | * | 500 | 500 | 500 |
| Na₂SiO₃.5H₂O (0.6-2.0 mm) | | | | |
| weight % | — | 9.0 | 8.8 | 8.8 |
| weight % calculated as Na₂O + SiO₂ | — | 5.4 | 5.3 | 5.3 |
| water/cement ratio | 0.50 | 0.36 | 0.36 | 0.36 |
| flow of the mortar (mm) (DIN 18555) | 175 | 195 | 195 | 190 |
| compressive strength of test piece (N/mm²) (DIN 1164) | | | | |
| after 1 day | 5.4 | 0.4 | 6.0 | 10.7 |
| after 28 days | 52.7 | 39.2 | 31.5 | 41.5 |
| % weight loss of test piece after 28 days' immersion in a 5% H₂SO₄ solution | 39.2 | 3.2 | 3.0 | 1.7 |

*The specific surface area of Enci Hofanorm blast-furnace cement - prepared by intergrinding - is 430 m²/kg.

The following can be concluded from the results obtained. Concrete produced with conventional cement without fly ash and sodium silicate is not resistant to a strongly acidic environment. If fly ash and sodium silicate are both present, only 1% by weight of portland cement clinker yields an insufficient initial compressive strength, while blast-furnace slag having a specific surface area of 450 m²/kg yields too low a final strength value. If a larger proportion of portland cement clinker is present (2.7% by weight) and the blast-furnace slag is relatively fine at the same time (specific surface area of 600 m²/kg), a cement is obtained which has a good initial compressive strength, an acceptable final compressive strength and a very good acid-resistance.

We claim:

1. A cement based on blast-furnace slag and fly ash, wherein the cement is a homogeneous dry particulate mixture in ready-to-use form, which comprises blast-furnace slag having a specific surface area of 500-650 m²/kg and fly ash in a weight ratio in the range of 20/80-60/40, and further consisting essentially of the following components in the amounts indicated, calculated on the total mixture:

| | |
|---|---|
| portland cement clinker | at least 2 wt. % |
| sodium silicate (calculated as Na₂O + SiO₂) | 2-12 wt. % |

2. A cement according to claim 1, wherein the portland cement clinker is present in an amount of 2-15% by weight.

3. A cement according to claim 1, wherein the weight ratio of blast-furnace slag to fly ash is within the range of 30/70-55/45 and that the remaining components are present in the following amounts: 2-6% by weight of portland cement clinker, and 4-7% by weight of sodium silicate (calculated as Na₂O+SiO₂).

4. A cement according to claim 1, wherein the sodium silicate is stable in the air, readily soluble in water, and has an SiO₂/Na₂O ratio within the range of 0.8-1.2.

5. A cement according to claim 4, wherein the sodium silicate contains water of crystallization.

6. A cement according to claim 5, wherein the sodium silicate comprises particles having a size of 0.2-2.0 mm.

7. A cement according to claim 1, wherein the portland cement clinker has a specific surface area of at least 300 m²/kg.

8. A method of preparing a cement consisting essentially of characterized by grinding the blast-furnace slag and the portland cement clinker to obtain a dry product having the desired fineness, and subsequently preparing the cement by mixing the constituent components in particulate form in the desired proportions at a temperature not exceeding 50° C., and optionally incorporating other additives according to need during said grinding and/or mixing treatments.

9. A mortar mix comprising mixing cement, water and conventional aggregates to make a mortar, which comprises using a cement as defined in claim 1 and, when making mortar, setting the ratio of water to cement at a value within the range of 0.25-0.40.

* * * * *

UNITED STATES PATENT AND TRADEMARK OFFICE
CERTIFICATE OF CORRECTION

PATENT NO. : 5,084,102
DATED : January 28, 1992
INVENTOR(S) : Brouns, et al

It is certified that error appears in the above-identified patent and that said Letters Patent is hereby corrected as shown below:

Column 4, line 12 aménd "26 wt%" to read

--2-6 wt%--

Column 4, line 13 amend "47 wt%" to read

--4-7 wt%--

Signed and Sealed this

Fifth Day of October, 1993

Attest:

Attesting Officer

BRUCE LEHMAN

Commissioner of Patents and Trademarks